Feb. 8, 1966     D. E. BRANNON     3,233,467
GYROSCOPE
Filed May 4, 1960

INVENTOR.
DONALD E. BRANNON
BY
ATTORNEY

United States Patent Office 3,233,467
Patented Feb. 8, 1966

3,233,467
GYROSCOPE
Donald E. Brannon, San Fernando, Calif., assignor to International Telephone and Telegraph Corporation, Nutley, N.J., a corporation of Maryland
Filed May 4, 1960, Ser. No. 26,799
7 Claims. (Cl. 74—5.7)

This invention relates to a gas bearing gyroscope and more particularly to a gyroscope which carries its own source of gas to be supplied to the bearing surfaces.

Gyroscopes of the prior art, as is well known, have various means to spin the rotor. One of the most commonly used means is an electric motor. Another means which is becoming increasingly popular is the use of gas to spin the rotor either using impuse-type drives or reaction jets. However, in all these cases it is, of course, essential that a source of power be supplied to the electric motor or the gas or air under pressure be supplied to the gas driven gyroscopes. This then entails additional equipment, such as pumps and generators or batteries of sufficiently large capacity, to drive the motor and propel the gas driven gyros. More particularly, in the field of missiles where the weight is limited and the space must be conserved, it would be advantageous to provide a gyroscope which carries its own source of energy for spinning the rotor.

It is an object of this invention to provide a gas bearing gyroscope which contains its own source of gas generation.

It is another object to provide a gas bearing gyroscope which contains means to control the reaction force which spins the rotor.

A feature of this invention is a gyroscope having a rotor which is supported for rotation on a shaft. A source of energy is carried by the shaft together with means adjacent the source to cause release of the energy. The rotor wheel has means which is responsive to the released energy to cause the rotor to rotate.

Another feature is that the released energy in the form of high pressure gas is stored within the rotor and fed to gas bearings supporting the rotor wheel for rotation about the shaft. The rotor wheel is provided with ports connected to the high pressure gas supply and valves disposed on the outside of these ports close the ports until the high pressure gas reaches a predetermined pressure. The valves will then open permitting the high pressure gas to escape in a manner such that the reaction force of the escaping gas causes the rotor wheel to rotate at high speed. When the gas pressure drops to the predetermined level the valves close the ports and the rotor wheel continues to rotate as long as the gas in rotor wheel continues to supply the gas bearings.

The above-mentioned and other features and objects of this invention will become more apparent by reference to the following description taken in conjunction with the accompanying drawing, in which.

Figure 1:
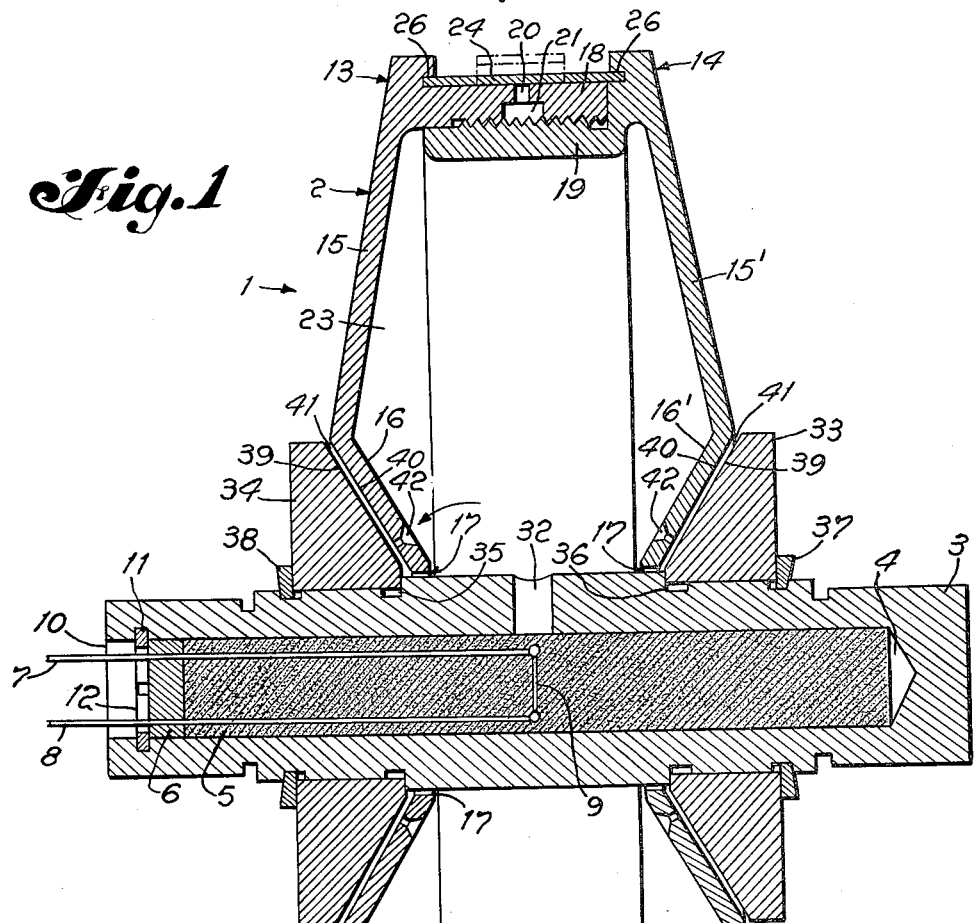
FIG. 1 is a sectional view of the gyroscope rotor illustrating the principles of this invention.
Figure 2:
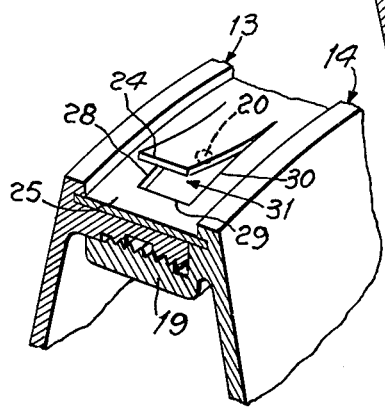
FIG. 2 is an isometric view of the valve used in the rotor.

With reference now to FIGS. 1 and 2, there is shown a rotor 1 comprising a rotor wheel 2 mounted for rotation about a shaft 3. The shaft 3 has a cylindrical cavity 4 in the midsection thereof in which is disposed a cartridge 5 of gas generating material. This material 5 may be a deflagrating material or a very low activated explosive material which should be a farily slow burning explosive such that there is a sustained burning period from about one to several seconds. In the cap 6 of the cartridge 5 are inserted two wires 7 and 8 which protrude within the explosive material 5 and are connected inside the material by a bridge wire 9 at the center of the cartridge 5. The cap 6 should preferably be of a strong metal which will prevent the gases resulting from the burning of the deflagrating material from passing out of the end 10 of the shaft 3. The cartridge 5 with the cap 6 should be fairly tightly fitted in the cylindrical cavity 4. To retain the cartridge 5 within the cavity 4, there is provided an undercut 11 in the shaft 3 and a split ring 12 is inserted therein to hold the cartridge 5 in position. Other means of retaining the cartridge in the cavity can be used. The wires 7 and 8 are connected to a battery and a switch (not shown). On closing of the circuit of the wires 7 and 8 with the battery and switch referred to, the current passing through the bridge wire 9 will cause a heating of the wire and consequent initiation of burning of the gas generating charge 5 as in any ordinary type of explosive fuse. The rotor wheel 2 is formed, for ease of manufacture, of two substantially hollow cylindrical members 13 and 14. Each of these members comprise a relatively thin side wall 15 and 15′ which is angularly disposed toward the axis of the shaft 3. A continuation 16 and 16′ of the side walls 15 and 15′ of each member of the rotor wheel is offset angularly from the respective walls 15 and 15′ and is spaced apart from the shaft 3 by an air gap 17. The member 13 has a circumferential rim 18 which is threaded on the inside thereof to receive a similar mating threaded member 19 of the member 14. In the circumferential rim 18 are disposed gas ports or orifices 20 equally spaced apart about the circumference thereof. The ports 20 connect with an annular channel 21 which runs along the inside circumference of the circumferential rim 18. The circumferential member 19 of the rotor member 14 also contains a plurality of openings 22 connecting the annular channel 21 with the interior cavity 23 of the rotor wheel 2. About the circumferential rim 18 and adjacent to the ports 20 are disposed an equivalent number of valve members 24. All the valve members 24 are made from one flat strip 25 of spring steel or similar material which is inserted in circumferential grooves 26 in each member 13 and 14 and each valve member 24 is formed by cutting the member 25 along three sides 28, 29 and 30 so that the valve member 24 can be forced open to provide a space 31 between the valve member 24 and the circumferential rim 18, thus exposing the underlying port 20 in the rotor wheel member 13. Orifices 32 connect the shaft cavity 4 with the rotor wheel cavity 23. When the deflagrating cartridge 5 is activated the resulting gases pass through the orifices 32 into the rotor hollow 23.

Bearing members 33 and 34 are disposed on the shaft 3 and retained in place thereon by shoulders 35 and 36 cut into the shaft at a desired distance apart and retaining rings 37 and 38. Bearing members 33 and 34 are tightly fitted on shaft 3 and do not rotate thereabout. Bearing surfaces 39 of each bearing member 33 and 34 are adjacent and spaced apart from bearing surfaces 40 of the rotor wheel elements 16 and 16′. The spaces 41 between the bearing surfaces 39 and 40, although shown greatly enlarged for purpose of illustration, are at the minimum distance consisting with the optimum bearing efficiency when the gas under pressure is introduced therein. Gas is introduced into the spaces 41 between the bearing surfaces by means of orifices 42 in the rotor elements 16 and 16′. These orifices 42 are equally spaced about the circumference of each rotor element 16 and 16′ to provide gas under substantially equal pressure in the air gaps 41 and into the air gaps 17 between the rotor wheel 2 and the shaft 3. Air gaps 17, however, should be made as small as possible.

In the operation of this gyroscope upon the initiation of an electric current through the wires 7 and 8 and the bridge wire 9, the bridge wire will heat up and initiate burning in the deflagrating material 5 which will release gas under very high pressure in the cavity 4. This high pressure gas will escape into the inner chamber 23 via the orifices 32. The valve members 24 in the rotor rim 18 will open full with the initial generation of gas when the gas pressure reaches a predetermined point which will force the free end of the valve member away from circumferential rim 18 thus opening the ports 20 and then close down due to their spring reaction as the gas pressure decreases after the initial burning reaction. The gas pressure as initially generated will force the sides 16 and 16' of the rotor wheel 2 outward toward the bearing members 33 and 34 thereby lessening the clearance between the bearing surfaces 39 of the bearing members and bearing surfaces 40 of the rotor wheel 2, thus providing maximum support during the time of maximum acceleration, that is, at the time of the onset of the burning of the gas generating charge 5. At the same time, the gas is forced into the spaces 41 between the bearing surfaces 39 and 40 via the orifices 42 thus providing a lubricant supply therebetween. When the gas pressure increases to a predetermined pressure level the free ends of the valve members 24 are forced upwards and away from the circumferential rim 18, thus exposing the ports 20. The gas escaping through the ports 20 will then be deflected by the under side of the valve members 24 and pass through the openings 31 in a direction that is substantially tangent to the rotor wheel 2, in effect constituting a reaction jet. The reaction forces of the tangentially directed jets cause the rotor wheel to rotate at high speed. At the conclusion of the burning of the deflagrating material 5 when the gas pressure decreases, the valve members 24 will close the ports 20 at the time that the pressure drops below the predetermined level. However, the rotor cavity 23 still has a supply of gas at a lower pressure which feeds out to the gas bearing spaces 41, thus permitting the rotor to continue rotation because of the inertia of the rotor wheel. Thus there is insured a prolonged supply of gas to the bearings even after the gas generating charge 5 has concluded its function. The gas generation charge should be a fairly slow burning deflagrating material, such as a polymer bound metal oxidant, so that there is a sustained burning period, one to several seconds, that would be sufficient to produce a rotor momentum and gas support for a short flight time, say for about 10 minutes or so. The gas generation material should be clean burning without residue. Of course the chemical composition of the charge will be such that the allowable bursting strength will be within the strength limits of the rotor wheel 2 and the shaft 3.

Figure 3:
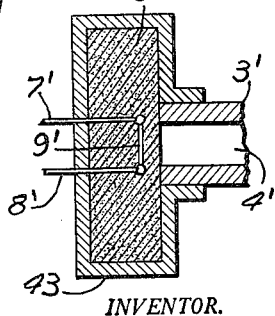
FIG. 3 is another embodiment of the gyroscope rotor shaft.

Another embodiment of this invention is shown in FIG. 3. In this embodiment a hollow cylindrical container 43 is fastened to each end of shaft 3' which is similar in construction to shaft 3. A container at each shaft end is used for balancing reasons. The deflagrating charge 5' is placed within the container 43 with the fuse connecting wires 7' and 8' protruding therefrom and the bridge wire 9' within the charge 5'. Upon firing of the charges simultaneously at both ends the release gas, as before, passes into the shaft cavity 4' and from there into the rotor wheel cavity 23. This embodiment will permit a larger charge of deflagrating material to be carried without necessitating any increase in the size of the shaft 3.

This invention is particularly useful in any number of applications which require a short flight time and extreme durability of the gyro as in cases where large accelerations can be anticipated. Instead of a gas generating charge of material of explosive nature, it is possible to use instead a cartridge containing a supply of gas under high pressure which can be opened by initiation of an electric current to supply its gas to the chamber 23 in the same manner as heretofore described. Although the valve members 24 have been shown fabricated from a single strip 25 of spring material it is obvious that separate valve members can be constructed of suitable material and affixed in the position described to the circumferential rim of the rotor.

The entire shaft and rotor combination of this gyroscope can be gimballed to a mounting fixture, in order that the gyro rotor may have one or two degrees of freedom, depending on its use.

While I have described above the principles of my invention in connection with specific apparatus, it is to be clearly understood that this description is made only by way of example and not as a limitation to the scope of my invention as set forth in the objects thereof and in the accompanying claims.

I claim:

1. A rotor device comprising a rotor wheel, the interior of said rotor wheel being hollow, a plurality of spaced ports disposed in the circumferential surface of said rotor wheel, a valve disposed on said circumferential surface adjacent to each said port therein to close said port and adapted to open said port at a predetermined pressure, means coupling each said port with the hollow interior of said rotor wheel, a shaft, said shaft having a cavity therein, means coupling said shaft cavity to said rotor interior, means disposing a source of energy in said cavity, means to initiate release of said energy in the form of gas, first bearing surfaces disposed on said shaft, second bearing surfaces disposed on said rotor wheel adjacent and spaced apart from said first bearing surfaces, means coupling said rotor wheel interior to said space between said first and second bearing surfaces whereby when gas is released under high pressure said gas passes into said rotor interior and into the space between said first and second bearing surfaces to support said rotor wheel for rotation upon said shaft and also through said circumferential ports to urge said valves away from said ports when said high pressure gas is at least at said predetermined pressure, thereby allowing said high pressure gas to escape from said rotor wheel, the reaction force of said escaping high pressure gas causing said rotor wheel to rotate about said shaft.

2. A rotor device comprising a rotor wheel, the interior of said rotor wheel being hollow, a plurality of spaced ports disposed in the circumferential surface of said rotor wheel, a valve disposed on said circumferential surface adjacent to each said port therein to close said port and adapted to open said port at a predetermined pressure, means coupling each said port with the hollow interior of said rotor wheel, a shaft, said shaft having a cavity therein, means coupling said shaft cavity to said interior, means disposing a source of energy in said cavity, means to initiate release of said energy in the form of gas, first bearing surfaces disposed on said shaft, second bearing surfaces disposed on said rotor wheel adjacent and spaced apart from said first bearing surfaces, means coupling said rotor wheel interior to said space between said first and second bearing surfaces whereby gas is released under high pressure, said gas passes into said rotor interior and into the space between said first and second bearing surfaces to support said rotor wheel for rotation upon said shaft and also through said circumferential ports to urge said valves away from said ports when said high pressure gas is at least at said predetermined pressure, thereby allowing said high pressure gas to escape from said rotor wheel, the reaction force of said escaping high pressure gas causing said rotor wheel to rotate about said shaft.

3. A rotor device comprising a rotor wheel, the interior of said rotor wheel being hollow, a plurality of spaced ports disposed in the circumferential surface of said rotor wheel, a valve disposed on said circumferential surface adjacent to each said port therein to close said port and adapted to open said port at a predetermined pressure, means coupling each said port with the hollow interior of said rotor wheel, a shaft, said shaft having a cavity therein, passages coupling said shaft cavity to said rotor interior, means disposing a deflagrating material in said cavity, means coupling a control signal to said deflagrating material, first bearing surfaces disposed on said shaft, second bearing surfaces disposed on said rotor wheel adjacent and spaced apart from said first bearing surfaces, means coupling said rotor wheel interior to said space between said first and second bearing surfaces whereby when a control signal is applied to said deflagrating material, gas under high pressure is released from said deflagrating material, said high pressure gas being conducted through said passages into said rotor interior, a portion of said high pressure gas passing into the space between said first and second bearing surfaces to support said rotor wheel for rotation upon said shaft and said high pressure gas within said rotor interior passing from said rotor interior through said circumferential ports to urge said valves away from said ports when said high pressure gas is at least at said predetermined pressure, thereby allowing said high pressure gas to escape from said rotor wheel, the reaction force of said escaping high pressure gas causing said rotor wheel to rotate about said shaft.

4. A rotor device comprising a rotor wheel, the interior of said rotor wheel being hollow, a plurality of spaced ports disposed in the circumferential surface of said rotor wheel, a valve disposed on said circumferential surface adjacent to each said port therein to close said port and adapted to open said port at a predetermined pressure, means coupling each said port with the hollow interior of said rotor wheel, a shaft, said shaft having a cavity therein, passages coupling said shaft cavity to said rotor interior, means disposing a deflagrating material in said cavity, a fuse disposed within said deflagrating material, means coupling said fuse to a control signal, first bearing surfaces disposed on said shaft, second bearing surfaces disposed on said rotor wheel adjacent and spaced apart from said first bearing surfaces, means coupling said rotor wheel interior to said space between said first and second bearing surfaces whereby when a control signal is applied to said fuse, a gas under high pressure is released from said deflagrating material, said high pressure gas being conducted through said passages into said rotor interior, a portion of said high pressure gas passing into the space between said first and second bearing surfaces to support said rotor wheel for rotation upon said shaft and said high pressure gas within said rotor interior passing from said rotor interior through said circumferential ports to urge said valves away from said ports when said high pressure gas is at least at said predetermined pressure, thereby allowing said high pressure gas to escape from said rotor wheel, the reaction force of said escaping high pressure gas causing said rotor wheel to rotate about said shaft.

5. A rotor device comprising a rotor wheel, the interior of said rotor wheel being hollow, a plurality of spaced ports disposed in the circumferential surface of said rotor wheel, a valve disposed on said circumferential surface adjacent to each said port therein to close said port and adapted to open said port at a predetermined pressure, means coupling each said port with the hollow interior of said rotor wheel, a shaft, said shaft having a cavity therein, passages coupling said shaft cavity to said rotor interior, means disposing a deflagrating material in said cavity, a fuse disposed within said deflagrating material, means coupling said fuse to a control signal, first bearing surfaces disposed on said shaft, second bearing surfaces disposed on said rotor wheel adjacent and spaced apart from said first bearing surfaces, means coupling said rotor wheel interior to said space between said first and second bearing surfaces whereby when a control signal is applied to said fuse, gas under high pressure is released from said deflagrating material, said high pressure gas being conducted through said passages into said rotor interior, a portion of said high pressure gas passing into the space between said first and second bearing surfaces to support said rotor wheel for rotation upon said shaft and said high pressure gas within said rotor interior passing from said rotor interior through said circumferential ports to urge said valves away from said ports when said high pressure gas is at least at said predetermined pressure, thereby allowing said high pressure gas to escape from said rotor wheel, the reaction force of said escaping high pressure gas causing said rotor wheel to rotate about said shaft.

6. A rotor device comprising a rotor wheel, the interior of said rotor wheel being hollow, a plurality of spaced ports disposed in the circumferential surface of said rotor wheel, a valve disposed on said circumferential surface adjacent to each said port therein, said valve comprising a relatively thin rectangular member with the long dimension thereof coinciding with the circumference of said circumferential surface and curved to correspond with the curvature of said surface, one end of said member being fixed relative to said circumferential surface and the other end thereof being disposed in closure relation to said port and adapted to open said port at a predetermined pressure, means coupling each said port with the hollow interior of said rotor wheel, a shaft, said shaft having a cavity therein, passages coupling said shaft cavity with said rotor interior, means disposing a deflagrating material in said cavity, a fuse disposed within said deflagrating material, means coupling said fuse to a control signal, first bearing surfaces disposed on said shaft, second bearing surfaces disposed on said rotor wheel adjacent and spaced apart from said first bearing surfaces, means coupling said rotor wheel interior to said space between said first and second bearing surfaces whereby when a control signal is applied to said fuse, gas under high pressure is released from said deflagrating material, said high pressure gas being conducted through said passages into said rotor interior, a portion of said high pressure gas passing into the space between said first and second bearing surfaces to support said rotor wheel for rotation upon said shaft and said high pressure gas within said hollow interior passing from said rotor interior through said circumferential ports to urge said valve members away from said ports when said high pressure gas is at least at said predetermined pressure, thereby allowing said high pressure gas to escape from said rotor wheel, the reaction force of said escaping high pressure gas causing said rotor wheel to rotate about said shaft.

7. A rotor device comprising a rotor wheel, the interior of said rotor wheel being hollow, a plurality of spaced ports disposed in the circumferential surface of said rotor wheel, a valve disposed on said circumferential surface adjacent to each said port therein to close said port and adapted to open said port at a predetermined pressure, means coupling each said port with the hollow interior of said rotor wheel, a shaft, said shaft having a cavity therein, passages coupling said shaft cavity to said rotor interior, a plurality of containers, means disposing a container adjacent said shaft at each end thereof, means coupling said shaft cavity to the interior of each said container, each said container containing a deflagrating material, a fuse disposed within said deflagrating material, means coupling said fuse to a control signal, first bearing surfaces disposed on said shaft, second bearing surfaces disposed on said rotor wheel adjacent and spaced apart from said first bearing surfaces, means coupling said rotor wheel interior to said space between said first and second bearing surfaces whereby when a control signal is applied simultaneously to the fuses of said containers, gas under high pressure is released from said deflagrating material into said shaft cavity, said high pressure gas being conducted through said passages into said rotor interior, a portion of said high pressure gas passing into the space between said first and second bearing surfaces to support said rotor wheel for rotation upon said shaft and said high pressure gas within said rotor interior passing from said rotor interior through said circumferential ports to urge said valves away from said ports when said high pressure gas is at least at said predetermined pressure, thereby allowing said high pressure gas to escape from said rotor wheel, the reaction force of said escaping high pressure gas causing said rotor wheel to rotate about said shaft.

References Cited by the Examiner

UNITED STATES PATENTS

| | | | |
|---|---|---|---|
| 1,077,344 | 11/1913 | Hennig | 74—5.12 X |
| 1,112,997 | 10/1914 | Ferranti | 74—5.22 |
| 2,380,578 | 7/1945 | Carlson | 74—5.7 |
| 2,474,072 | 6/1949 | Stoner | 74—5.7 |
| 2,476,857 | 7/1949 | Grafinger | 74—5.7 X |
| 2,729,106 | 1/1956 | Mathiesen | 74—5 X |
| 2,743,576 | 5/1956 | Crockett | 74—5.7 X |
| 2,960,876 | 11/1960 | Saphra | 74—5.7 |

BROUGHTON G. DURHAM, *Primary Examiner.*